(12) United States Patent
Sample et al.

(10) Patent No.: US 10,366,118 B2
(45) Date of Patent: Jul. 30, 2019

(54) EM-ID: TAG-LESS IDENTIFICATION OF ELECTRICAL DEVICES VIA ELECTROMAGNETIC EMISSIONS

(71) Applicant: DISNEY ENTERPRISES, INC., Burbank, CA (US)

(72) Inventors: Alanson Sample, Pittsburgh, PA (US); Chouchang Yang, Pittsburgh, PA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 314 days.

(21) Appl. No.: 15/462,457

(22) Filed: Mar. 17, 2017

(65) Prior Publication Data

US 2017/0270198 A1    Sep. 21, 2017

Related U.S. Application Data

(60) Provisional application No. 62/309,592, filed on Mar. 17, 2016.

(51) Int. Cl.
| | | |
|---|---|---|
| G06F 17/30 | (2006.01) | |
| G06F 16/38 | (2019.01) | |
| G06F 16/21 | (2019.01) | |
| G06F 16/33 | (2019.01) | |

(52) U.S. Cl.
CPC .......... *G06F 16/381* (2019.01); *G06F 16/211* (2019.01); *G06F 16/334* (2019.01)

(58) Field of Classification Search
CPC ..... G06F 16/381; G06F 16/334; G06F 16/211
USPC ..................................................... 340/10.42
See application file for complete search history.

(56) References Cited

U.S. PATENT DOCUMENTS

| | | | | |
|---|---|---|---|---|
| 5,420,910 | A * | 5/1995 | Rudokas ............... | H04M 15/00 455/405 |
| 7,420,474 | B1 * | 9/2008 | Elks ....................... | G06F 21/73 340/678 |
| 7,464,005 | B1 * | 12/2008 | Beetner .................. | G01S 7/021 342/463 |
| 8,798,573 | B2 * | 8/2014 | Denning, Jr. ......... | H04M 11/007 340/539.22 |
| 2006/0082488 | A1 * | 4/2006 | Keller, III ............. | F41H 3/00 342/22 |
| 2009/0305665 | A1 * | 12/2009 | Kennedy ................ | H04L 63/08 455/410 |
| 2010/0050259 | A1 * | 2/2010 | Christofferson ...... | H04H 20/12 726/23 |
| 2011/0267222 | A1 * | 11/2011 | Craig .................... | G01S 13/878 342/25 B |
| 2012/0179812 | A1 * | 7/2012 | Keller, III ............. | F41A 17/06 709/224 |

(Continued)

*Primary Examiner* — Edwin C Holloway, III
(74) *Attorney, Agent, or Firm* — Marsh Fischmann & Breyfogle LLP; Robert G. Crouch; Kent A. Lembke (57) ABSTRACT

A technique for identifying individual instances of electronic devices. This is done by using a basic RFID reader to read the RF emissions from the electronic device to obtain an emitted electromagnetic spectrum and compare it to a library of emitted electromagnetic spectrums of different instances of that type of electronic device and, based on that comparison, finding a best match and identifying the electronic device as being a particular instance of that type of electronic device. This comparison may be made by computing Euclidean distances between vectors that are based on the measured electromagnetic spectrums.

32 Claims, 9 Drawing Sheets

(56) References Cited

U.S. PATENT DOCUMENTS

2014/0340192 A1* 11/2014 Yamada ............. G01R 29/0814
  340/5.8
2015/0350914 A1* 12/2015 Baxley .................. H04W 12/08
  726/11
2017/0124816 A1* 5/2017 Yang .................. G06Q 10/0833

* cited by examiner

|         | iPhone6 | MBPRT | Screen | Toy | Lights |
|---------|---------|-------|--------|-----|--------|
| iPhone6 | 100     | 0     | 0      | 0   | 0      |
| MBPRT   | 0       | 100   | 0      | 0   | 0      |
| Screen  | 0       | 0     | 100    | 0   | 0      |
| Toy     | 0       | 0     | 0      | 100 | 0      |
| Lights  | 0       | 0     | 0      | 0   | 100    |

EM-ID: TAG-LESS IDENTIFICATION OF ELECTRICAL DEVICES VIA ELECTROMAGNETIC EMISSIONS

CROSS-REFERENCE TO RELATED APPLICATIONS

This application claims the benefit of U.S. Provisional Application No. 62/309,592, filed Mar. 17, 2016, the contents of which are incorporated herein by reference in its entirety.

BACKGROUND

The five-cent RFID tag was famously claimed to be the tipping point for the RFID industry that would lead to widespread adoption of the technology. While many of the innovations in cost reduction outlined in 2001 have come to pass, the five-cent price point has remained elusive at any quantity. Presently, EPC Gen2 tags (ISO-18000-6c) can be readily purchased individually for ninety-cents online and industry trade magazines report that, in large volumes, tags can be purchased in the seven- to fifteen-cent range. While both academia and industry continue to make strides to reduce the cost of traditional UHF RFID tags, the reality is that due to inflationary forces the opportunity for a five-cent tag may have already passed us by.

In an effort to further reduce cost and tag complexity, researchers are focusing on developing chip-less and antenna-less RFID tags. The general rule of thumb being that—a third of the cost of the tag is the integrated circuit (IC), the second third is the antenna inlay, and the final third represents the cost of bonding the two elements together. Therefore, by eliminating one of these elements, it should be possible to further reduce the cost of RFID tags.

However, all of these RF methods of uniquely identifying an object rely on adding some form of tag. For many applications, RFID is simply dismissed as being too expensive compared to the alternative of using optical identification in the form of printed barcodes or QR codes. While barcodes are often considered to be "free" they do take up valuable real estate on print media and/or require printed stickers that are manually applied to objects, both of which represent non-zero costs. This begs the question: Can Radio Frequency Identification ever cost less than a barcode?

It is against this background that the techniques described herein have been developed.

SUMMARY

Disclosed herein is a method for identifying a particular instance of an electronic device. The method includes receiving a spectrum of electromagnetic signals emitted by an electronic device under examination; comparing the received spectrum of electromagnetic signals to a library of spectrums of electromagnetic signals, each of the spectrums of electromagnetic signals in the library representing the spectrum of electromagnetic signals produced by a particular instance of an electronic device; finding a best match of the received spectrum of electromagnetic signals to one of the spectrums of electromagnetic signals in the library; and identifying the electronic device under examination as the electronic device in the library that produces the spectrum of electromagnetic signals to which the best match was made.

The comparing and finding operations may include converting the spectrum of electromagnetic signals emitted by the electronic device under examination to a first vector and computing the Euclidean distance from the first vector to a plurality of vectors that each correspond to one of the spectrums of electromagnetic signals in the library. The receiving operation may include providing an antenna and amplifying signals detected by the antenna. The received spectrum may include the portion of the electromagnetic spectrum up to 1 MHz, up to 500 kHz, up to 200 kHz, up to 100 MHz, up to 20 kHz, up to 10 kHz, up to 5 kHz, or up to 3 kHz.

Also disclosed herein is a method including separately for each of a group of electronic devices of the same type, receiving the spectrum of electromagnetic signals emitted by each electronic device in the group; creating a library of the received spectrums, including an indication of which electromagnetic device in the group produced each spectrum; subsequently, receiving a spectrum of electromagnetic signals emitted by an electronic device under examination; comparing the received spectrum of electromagnetic signals to the library of spectrums of electromagnetic signals; finding a best match of the received spectrum of electromagnetic signals to one of the spectrums of electromagnetic signals in the library; and identifying the electronic device under examination as the electronic device in the library that produces the spectrum of electromagnetic signals to which the best match was made.

The comparing and finding operations may include converting the spectrum of electromagnetic signals emitted by the electronic device under examination to a first vector and computing the Euclidean distance from the first vector to a plurality of vectors that each correspond to one of the spectrums of electromagnetic signals in the library. The receiving operation may include providing an antenna and amplifying signals detected by the antenna. The received spectrum may include the portion of the electromagnetic spectrum up to 1 MHz, up to 500 kHz, up to 200 kHz, up to 100 MHz, up to 20 kHz, or up to 10 kHz.

BRIEF DESCRIPTION OF THE DRAWINGS

FIGS. 9A-9E are confusion matrices showing the likelihood that a particular device can be positively identified out of a population of devices of the same model.

DETAILED DESCRIPTION

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

As part of addressing the problems described in the background above, it has been recognized that yes RF identification can cost less than a barcode. In fact, there exists a subset of over a billion electronic devices that already have a unique radio frequency identity and are simply waiting to be read. We introduce a tag-less Radio Frequency Identification method that uses the unique electromagnetic signatures emitted by electronic devices as a means to identify individual objects, even of the same type and model. For example, this method could be used to distinguish one Dell laptop of a given model from another Dell laptop of the same model.

Traditionally Electro-Magnetic Emissions (EME) have been simply thought of as incidental system noise that must be kept below a certain threshold to meet governmental regulations—the fact is that EME is highly structured and a direct manifestation of the system circuits that generate it. Furthermore, variations in the manufacturing process at all levels, from the integrated circuits, to passive components, and board level layout all provide further EME differences between devices, even of the same model.

Figure 1:
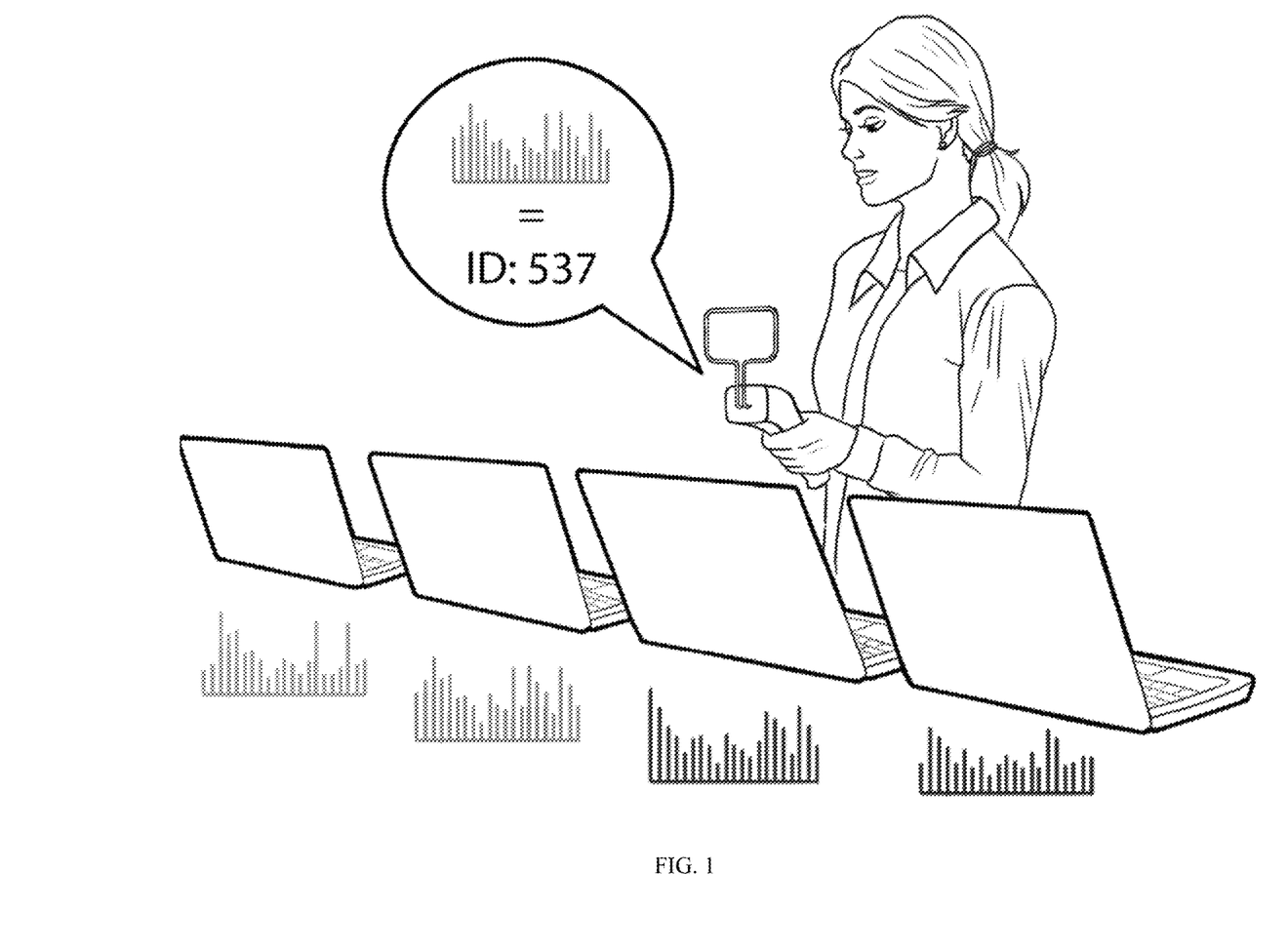
FIG. 1 is a depiction of an IT professional scanning the unique electromagnetic noise generated by the unmodified laptops in order to determine their unique IDs and recover their asset management information.

One example are laptops, perhaps those used within a company. FIG. 1 depicts an application scenario where an IT professional scans an unmodified electronic device (such as a laptop) to extract its unique electromagnetic identification (EM-ID) (which is analogous to an electronic fingerprint), which is then entered into a database. Since the EM-ID is persistent over time, the object can be scanned at a later date and its EM-ID is then compared to a database for identification. This unique identification method is free, in the sense that it already exists, cannot be removed, or be easily tampered with, but it does require that the device is powered on to generate the EME signal.

Previous work has shown that EME can be used to identify general classes of objects, for instance household appliances, computing devices, power tools, automobiles, etc. However, using these methods it is not possible to uniquely identify objects of the same model, nor is it possible to assign them individual IDs.

We introduce an inexpensive (e.g., ten-dollar) electromagnetic emissions reader based on a software defined radio and a signal processing pipeline that is capable of robustly and repeatedly extracting the unique EM-IDs of individual devices. An overview of the system is presented below, along with a detailed description of a new signal processing and ranking algorithm used to identify individual objects. Since the EME signals emitted by a device are an emergent property and not simply a fixed digital number, a mathematical description is provided of the probability distribution of the EME of a device and our ability to disambiguate similar devices in terms of the probability of successful identification. Lastly, experimental results are presented that show a wide range of devices of different complexity levels—from toys to cell phones and laptops—can all be uniquely and repeatedly read and identified.

System Overview

This section provides a general overview of the process of scanning, classifying and identifying individual devices based on their electromagnetic signatures. Subsequent sections provide a deep dive into the algorithms needed for fine-grained object identification, and details on predicting the identification performance of a given set of devices.

EM-ID Reader Hardware

While lab equipment such as spectrum analyzers and high-speed oscilloscopes have traditionally been used to capture the electromagnetic signatures emitted by electronic and/or electromechanical devices, this work utilizes a software defined radio module based on the RTL-SDR, which works in conjunction with a smartphone or laptop to form a portable and low cost EM-ID scanner.

The RTL-SDR is sold online for approximately ten dollars as a USB receiver under various brand names and is based on the Realtek RTL2832 chip which (with a two-chip solution, includes a radio receiver front end with a down converting mixer, as well as the RTL2832) performs I-Q demodulation and digitizes the IF signal with high speed 8-bit ADCs. The system streams raw data to a host computer via USB. In order to sample the low frequency EMI, the RF front end chip was removed and a WD2142 transformer is used to feed the raw EMI into the RTL2832.

The internal digital mixer and low-pass filter provide a selectable frequency window from 0 to approximately 28.8 MHz at a maximum sampling rate of approximately 3.2 MHz. Since most EM signals exist at the low frequencies of this range, the sampling rate is set to approximately 1 MHz allowing the system to observe EM signals from 0 to 500 kHz. It should be understood, that that a sampling rate could be selected to observe signals up to any other suitable frequency (e.g., 1 MHz, 500 kHz, 200 kHz, 100 kHz, 50 kHz, 20 kHz, 10 kHz, 5 kHz, 3 kHz, 2 kHz, 1 kHz, or other).

Figure 2:
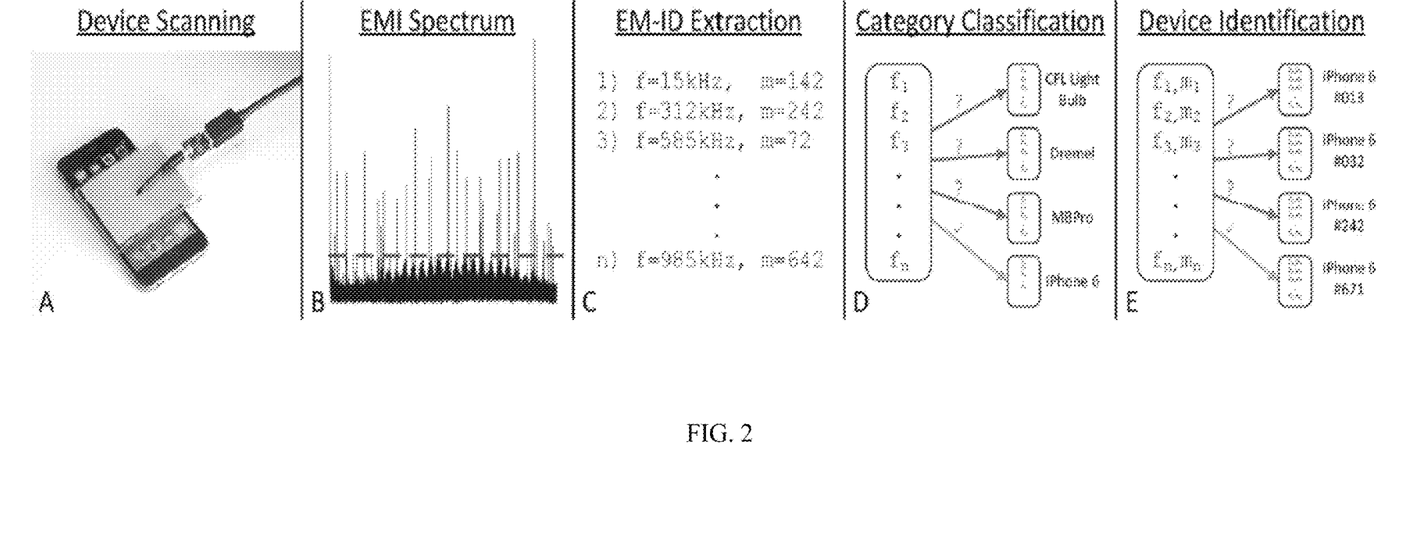
FIG. 2 depicts the process of uniquely identifying an electronic device (in this case an unknown iPhone 6) based on its low frequency electromagnetic emissions. Panel A shows a low cost EM-ID reader recording the EM signature shown in panel B. This signature is thresholded to remove noise and the device's EM-ID is extracted as depicted in panel C. In order to identify what type of device it is, a classification algorithm is done in panel D. Once the object type is known, it is compared to all other iPhone 6s in the database in order to recover its unique ID, as shown in panel E.

FIG. 2A, shows a smartphone being scanned, with FIGS. 2A-2E together depicting the process of uniquely identifying an electronic device (in this case an unknown iPhone 6) based on its low frequency electromagnetic emissions or EM signature. An antenna including an electrically short monopole is used to capture the EME signals, which are fed to the modified RTL-SDR, and then processed by a host PC.

EM-ID Extraction

Once the EME signal is digitized and sent to the host PC, it is converted to the frequency domain as illustrated in the EM signature shown in FIG. 2B. In order to extract an EM-ID from the raw FFT data, the low magnitude noise must be removed. This is done by setting a threshold, which is 1% higher than the difference between the peak and average signal magnitude:

Threshold=((peak−mean)×1%)+mean

Data points above the threshold are stored in an array of frequency and magnitude pairs that represents the EM-ID of the device, as shown in FIG. 2C. While the number of frequency peaks is dependent on the device type, typical EM-IDs have a length of 1,000 to 2,000 elements.

Once the EM-ID of a device has been recorded, it can be stored in a central database along with other asset management information such as asset number, manufacturer, model, owner, etc. Since an EM-ID is based on random variations in the manufacturing of the electronic device it cannot be known a priori. Thus, each device must be registered in a database, which is a typical process for most RFID applications.

Category Classification and Device Identification

As with all RFID systems, the ID number is simply a means of linking a physical object to a database of attributes, or to trigger an event/action. Since the EM-ID cannot store custom user information, the challenge is to link the EM-ID of an unknown scanned object to the correct entry stored in the database of EM-IDs. The process of quickly searching a database is more complicated for EME based identification since the EM-ID is an emergent statistical property of the system rather than a digitally stored ID number.

As will be described below, the EM-ID is the result of a probability distribution. While it will be shown that the probability distribution from one device to the next is indeed unique and non-overlapping (and thus sufficient for identification), for the purpose of this system overview it is important to remember that from one read to the next there may be a small perturbation in a device's EM-ID. Therefore, to uniquely identify an individual device (that exists in the database) there is a two-stage ranking process starting with category classification and then device identification.

The goal of the category classification stage is to determine what type of device the unknown object is, thereby greatly reducing the search space for the identification stage. Category classification based on support vector machines (SVM) can be done robustly across a wide variety of devices. In this patent application, we implemented a ranking system based on the cosine similarity function, which greatly reduces the computation complexity and eliminates the need for training. As shown in FIG. 2D, the frequency components of the EM-ID of the unknown iPhone 6 are compared to examples of each of the subcategories, as part of a classification algorithm. The results are ranked and the high matching categories are flagged for further examination in the device identification stage.

Figure 3:
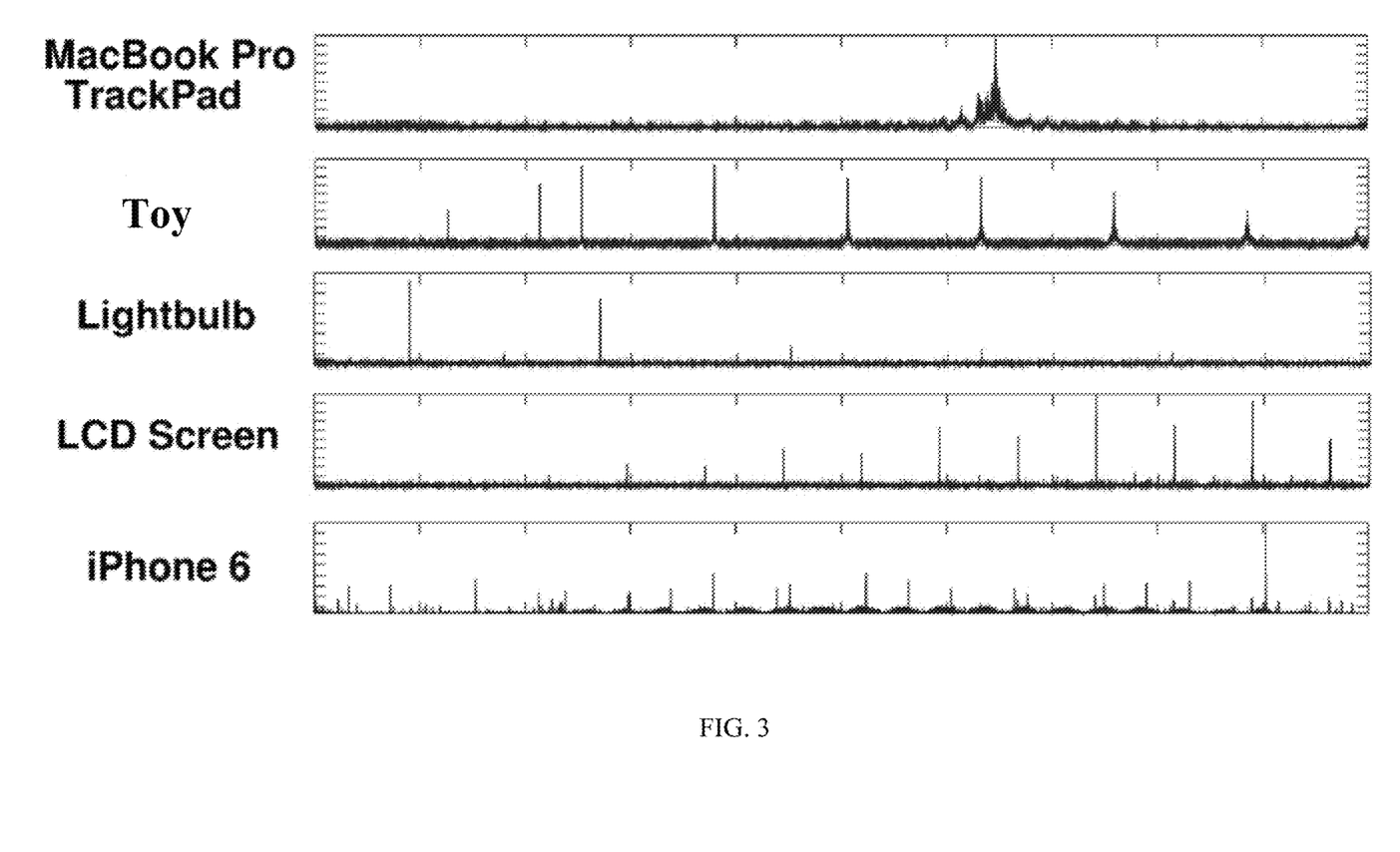
FIG. 3 shows representative frequency domain plots from 0 to 500 kHz of the EM signals from five different categories of devices. The distinctive patterns are a manifestation of the circuit topology and are unique to each device category.

To give some intuition into the effectiveness of this approach, FIG. 3 shows the frequency distribution of five example devices (MacBook Pro, toy, florescent lightbulb, LCD Screen, and an iPhone 6), which includes representative frequency domain plots from 0 to 500 kHz of the EM signals from these five different categories of devices. The distinctive patterns are a manifestation of the circuit topology and are unique to each device category. Visually, it is easy to see that the spikes along the 500 kHz frequency range are identifiable and unique to each object. Once this data is thresholded, the resulting frequency and magnitude pairs are recorded and robust similarity scoring can be done.

The final stage of the process is device identification which is depicted in FIG. 2E. Here, the goal is to disambiguate one device from others of the same type and model. For instance, to distinguish one iPhone 6 from a population of iPhone 6's. This is a much more challenging task, as the frequency distribution will have a much higher likelihood of overlapping. As will be described in detail below, both the frequency and magnitude components of the EM-ID will be used along with the cosine similarity function to uniquely determine the identity (unique ID) of the unknown object.

Mitigating EM-ID Reader Variations

As with all radio receivers, different EM-ID readers have variations in signal sensitivity as well as different local oscillator precisions and offsets. Even when using the same EM-ID reader to rescan a given device, variations in reader antenna placement and distance can result in differences in the absolute magnitude of the EM signal. These variations can result in measurement uncertainty in both frequency and magnitude. The following section presents methods for mitigating these issues, thus allowing multiple EM-ID readers to be used interchangeably.

Since the local oscillator (LO) on the EM-ID reader is used as a reference to measure the frequency components of the received electromagnetic emissions from the device under test, variations in the LO over time or from reader to reader, will result in mis-measured frequencies. For example, in this work, the EME signals are sampled at a rate of approx. 1 MHz and an FFT window size of $2^{17}$ is used when converting from the time domain to the frequency domain. This results in a frequency resolution (or frequency bin width) of approx. 7 Hz. However, the local oscillator used on the RTL-SDR has an accuracy of only approx. 10 PPM (parts per million) and at 1 MHz this results in an uncertainty of approx. 10 Hz. Thus, it is possible that a signal source of approx. 100 Hz will be measured by one reader at approx. 110 Hz and another reader at approx. 90 Hz, resulting in a mismatch between the respective frequency indexes in the recorded EM-ID. While changing system parameters such as FFT window size, sampling rate, and oscillator accuracy can improve the system, the underlying problem still exists. In typical radio systems, this issue is overcome by having the transmitter send a pilot tone that the receiver's Phase Lock Loop can lock on to. However, no such signal exists for an EM-ID reader due to the emergent nature of EMI signals.

To mitigate the LO issue, a pseudo pilot tone approach is used where the frequency component with the maximum signal strength of the first EM-ID is used to align to the second EM-ID. Since the amount of frequency uncertainty is known, only peaks that are within approx. +/−10 Hz are used for alignment, thus greatly reducing false matches for unrelated frequency spikes. For example, consider an EM signal which has multiple tones scattered over the frequency spectrum, two different EM-ID readers may measure the strongest frequency tone differently at approx. 100 Hz and 110 Hz. The frequency compensation algorithm can shift all the 110 Hz data by a −10 Hz offset. Therefore, after frequency offset compensation, two different measurements reach a consensus in terms of frequency measurements such that later their similarity can be evaluated.

The magnitude of recorded EM signals can vary significantly based on the EM-ID reader's sensitivity and the distance and placement of the reader antenna to the device under test. To deal with this issue, the signals are normalized to a unit vector for similarity evaluation in later sections. Generally speaking, measurements can be taken robustly without the user worrying about aligning the antenna as long as it is touching or is tapped on the object of interest. For instance when scanning an iPhone, it simply needs to be placed on the reader. Alternatively when scanning a Mac- Book Pro track pad, the EM-ID reader antenna should touch the pad and not the LCD screen, as that would be a different measurement. This does make the reasonable assumption that there is not significant frequency dependent attenuation caused by user antenna placement or drifts in the analog front end of the reader.

Fine-Grained Classifier for Similarity Measures

Similarity measures between datasets have been studied in several fields. These techniques include Euclidian distance, cosine similarity and relative entropy—these approaches quantify the similarity of two vectors in high dimensional data space. For example, cosine similarity computes the score between two vectors; the higher the score of cosine similarity, the more similar the datasets. In this section, a two stage cosine similarity algorithm is used to first classify the category of an unknown device and then determine its true identity by correctly determining which entry in the EM-ID database it belongs to.

Cosine Similarity

Cosine similarity gives a score based on the similarity of two vectors in higher dimensional space. Consider a time series EM signal $[x_1, x_2, x_3, \ldots, x_n]$ sensed by an EM-ID reader. The frequency transform of this EM signal is $X = \mathcal{F}\{x\}$ and represents the EM signal's frequency distribution. The vector $X=[X_1, X_2, X_3, \ldots, X_N]$ represents the EM signal data in the frequency domain where each element Xi ($0 \leq i \leq N$) refers to the signal strength at the $i_{th}$ frequency bin. Similarly, another unknown EM signal after frequency transformation is Y. By viewing each EM signal X and Y as an n-dimensional vector, the cosine similarity yields a score calculated by:

$$C.S.(X,Y) := X \cdot Y/\|X\|\|Y\| = (\Sigma_{i=1}^N X_i Y_i)(\Sigma_{i=1}^N X_i^2)^{-1/2} (\Sigma_{i=1}^N Y_i^2)^{-1/2} \quad (1)$$

A high value of cosine similarity corresponds to two similar datasets. Since each element Xi and Yi for $0 \leq i \leq N$ represents absolute magnitude, the values Xi and Yi are always positive—this results in a cosine similarity range between 0 to 1. A similarity score of 0 implies two vectors are orthogonal to each other, while a score of 1 indicates the two vectors are identical. Given two known EM signals X and Y obtained from an electronic object "E" and "G" respectively, and an unknown EM signal X', using cosine similarity we can identify which object the unknown vectors corresponds to. If C.S. (X, X')>C.S. (Y, X'), then the cosine similarity indicates the unknown EM signal X is from the same source as X Hence, the result identifies the unknown signal X' as the electronic object "E." Similarly, if C.S. (X, X')<C.S. (Y, X'), the unknown EM signal X' is identified as the electronic object "G."

Gain Difference vs. Similarity

Equation (1) implies that all gain differences can be mitigated because each vector X and Y are normalized by their total energy $\|X\|$ and $\|Y\|$ respectively. To illustrate this concept, consider a time series EM signal x' that has a times more gain than x ($x'=\alpha x$). By applying the fact that the same gain exists in the frequency domain as $X'=\alpha X$, the cosine similarity can be obtained by $$C.S.(X', Y) := (X' \cdot Y/\|X'\|\|Y\|) = (\alpha X \cdot Y/\alpha \|X\|\|Y\|) = C.S.(X, Y) \quad (2)$$

Equation (2) indicates that the signal strength, in terms of gain coefficient, will be normalized through the cosine similarity calculation. Thus, once the EM signals for given devices are established in a database, the cosine similarity can evaluate each set of new unknown EM signals even when measured in different positions and orientations, or by different EM-ID readers.

Category Classification

When EM signals are from different device categories, most of their frequency bins do not overlap. This can be seen in FIG. 3, where the Macbook Pro trackpad, toy, florescent lightbulb, LCD screen, and iPhone 6 have completely different frequency distributions. Since their internal circuit structures are completely different, different categories have no or few common frequency bins. When two vectors have no common frequency bins, the cosine similarity returns to zero. For example, two EM signals from different categories with frequency distribution $X=[X_1, X_2, X_3, 0, 0, \ldots, 0]$ and $Y=[0, 0, 0, Y_1, Y_2, Y_3, 0, 0, \ldots, 0]$ have zero scores. If EM signal vectors are from different objects but are within the same category, their frequency distributions usually have a higher fraction of common frequency bins because of their similar circuitry. The toy example shown in FIG. 4 yields a very similar frequency distribution and a higher fraction of overlapping frequencies. Consider two EM signal vectors from the same categories as $X=[X_1, X_2, X_3, 0, 0, \ldots, 0]$ and $Y=[0, Y_1, Y_2, Y_3, 0, 0, \ldots, 0]$, their cosine similarity is $(X_2 Y_1 + X^3 Y^2)(\|X\|\|Y\|)^{-1}$ and returns a non-zero score. As a result, different objects within the same category can have a higher cosine similarity than objects from different categories. By leveraging this property, we can first identify the class of device by using a known vector for each category. For example, comparing an EM signal of an unknown device to representative EM-ID vectors from each category of devices in the database will result in a set of similarity scores. The highest score will correspond to the category of the unknown device which can then be used to narrow the search space when determining the identity of the object among objects of the same category and model in the database.

Fine-Grained Identification

Once the class of a device is determined, it is then compared to all known objects in the database of the same class using the cosine similarity function to determine its identity. The highest score is used to return the object's true ID. For example, an unknown object is first compared to one representative of each device class in the EM-ID database. If the highest scoring EM-ID vector is the toy class then the unknown device is compared to all toys of that type in the EM-ID database. The system will then return the ID of the toy with the highest probability match based on the cosine similarity function.

Predicting Identification Success Rate

Since the electromagnetic emissions from electronic devices are an emergent property of the system and not specifically designed to be unique, there is the possibility that the EM emission spectrums of closely related devices will overlap causing identification errors. To investigate this issue we employ the Euclidean distance function to analyze a large population of EM signatures for a set of devices, and then by modeling them as a Gaussian distribution, we are able to calculate the probability of successfully identifying a given device.

Performance Analysis via Euclidean Distance

When comparing two vectors, the Euclidean distance function computes the same information as the cosine similarity function but its output is a linear vector rather than angle which makes it more applicable for plotting and manipulating probability distributions. Given two EM-IDs represented by an n dimensional vector of frequency and magnitude pairs (X, Y). The Euclidean distance can be calculated by first taking the unit vector of each $u_x=(X)(\|X\|)^{-1}$, $u_y=(Y)(\|Y\|)^{-1}$ and then calculating the distance between them $d(u_x, u_y) = \|u_y - u_x\|$. Smaller values of $d(u_x, u_y)$ represent EM-ID vectors that are closely aligned, while larger distance numbers indicate vectors that are dissimilar.

Figure 4:
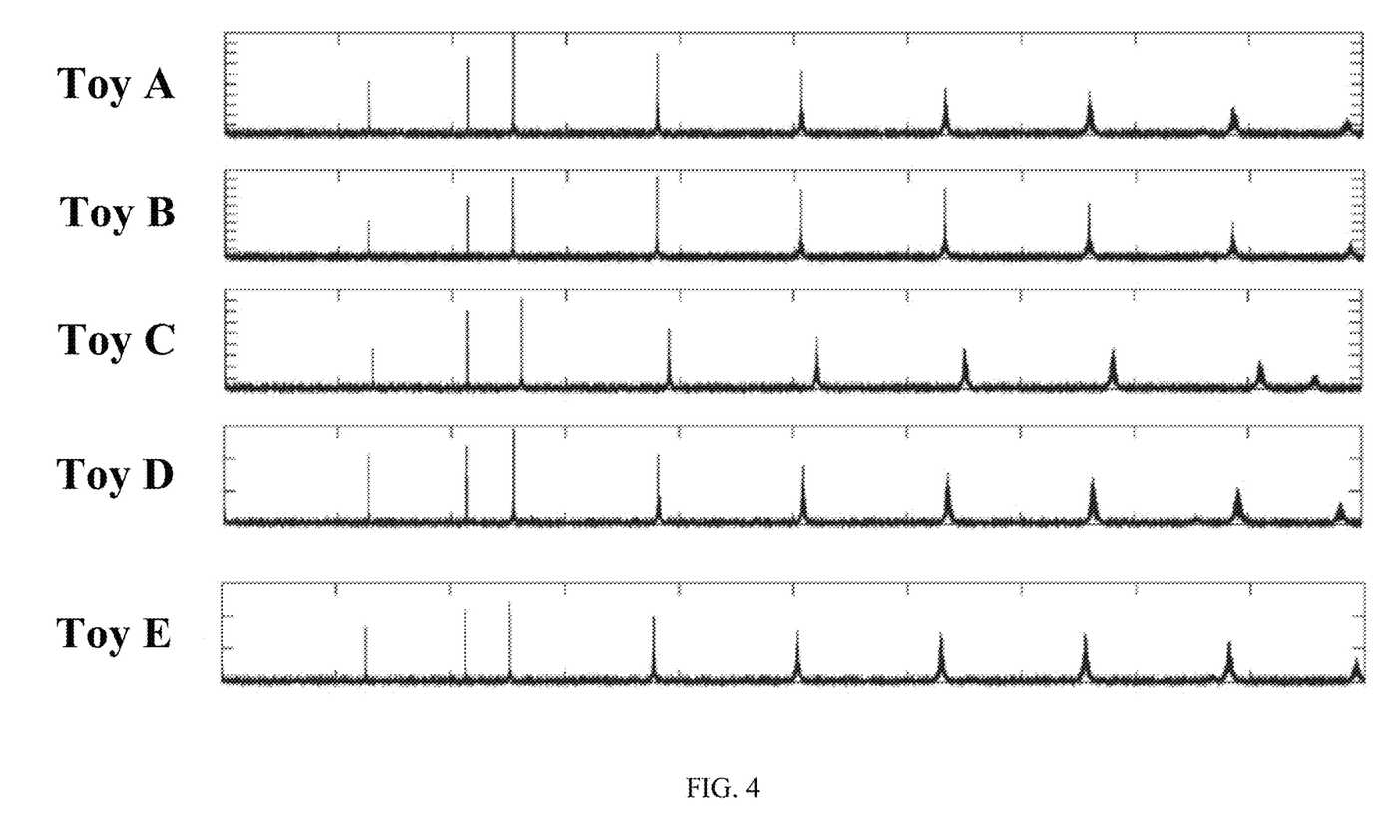
FIG. 4 shows frequency domain plots from 0 to 500 kHz of the EM signals for five identical toys. Since the same circuit is used in each device the frequency distributions are similar to each other, although close inspection shows that indeed there are small differences.

We now return to the previous example of five identical toys as shown in FIG. 4, which consists of five known EM signals A, B, C, D, and E. With the goal of showing how robustly toy A can be identified out of the population of five devices, 300 scans of test data are taken of toy A and denoted by $\hat{A}_i$ where i=1, 2, ..., k represents each trial. Computing the Euclidean distance of all 300 trials of $\hat{A}_i$ across the five known elements in the data base (A, B, C, D, and E) results in 1,500 similarity measurements. These measurements are then normalized and plotted as the probability histogram depicted in FIG. 5. For instance the red block of histogram data shows all 300 distance measurements between toy $\hat{A}_i$ and A (i.e., measurements against itself). As expected, the distance between the test data $\hat{A}_i$ and A is smaller than the distances reported for the other toy, B maroon, C green, D blue, and E khaki. Furthermore since the red histogram for A does not overlap with any of the other toys, this shows that it is sufficiently unique compared to its peers, such that it can be robustly identified without errors.

Figure 6:
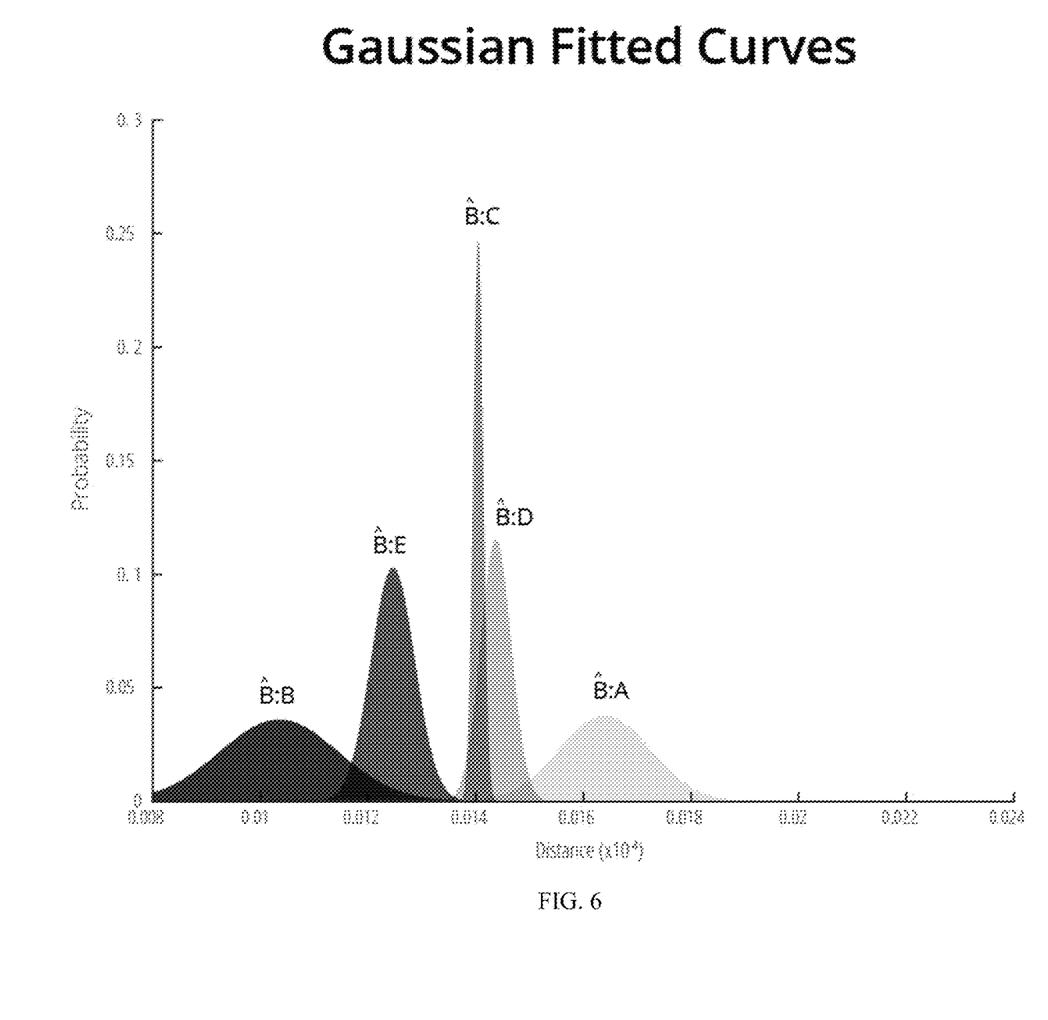
FIG. 6 shows the histogram distance distributions of EM signals from Macbook Pro trackpads. The distances of the pair of EM signals collected from the Macbook Pro B has some overlapping areas with the distance between the pair of Macbook Pro $B_i$ and E such that the identification failure happens. The error performance can be predicted through Gaussian distribution models.

While the toy is an example of a class of devices where it is easy to identify individual instances of the given device this is not always the case. As can be seen in FIG. 6, which shows a histogram of the measured Euclidean distance of five identical Apple Macbook Pros. As in the previous example, 300 test scans of Macbook Pro B's trackpad $B_i$ was scanned and the Euclidean distance between it and each of the five Macbook Pros in the database (A, B, C, D, and E) are calculated and plotted resulting in 1,500 data points. Ideally, MacBook Pro B (shown as a green histogram) should have the smallest distance when compared to the other four MacBook Pros. However, some of MacBook Pro's E histogram (shown in khaki) overlaps with the MacBook Pro B which results in an increased probability of identification errors. These two examples show that the higher the degree of overlap of the histogram (i.e. the higher the similarity between devices), the higher the probability of classification and identification errors. Likewise if the histograms do not overlap and have wide margins, the probability of errors is quite low.

Gaussian Distribution Prediction

Figure 5:
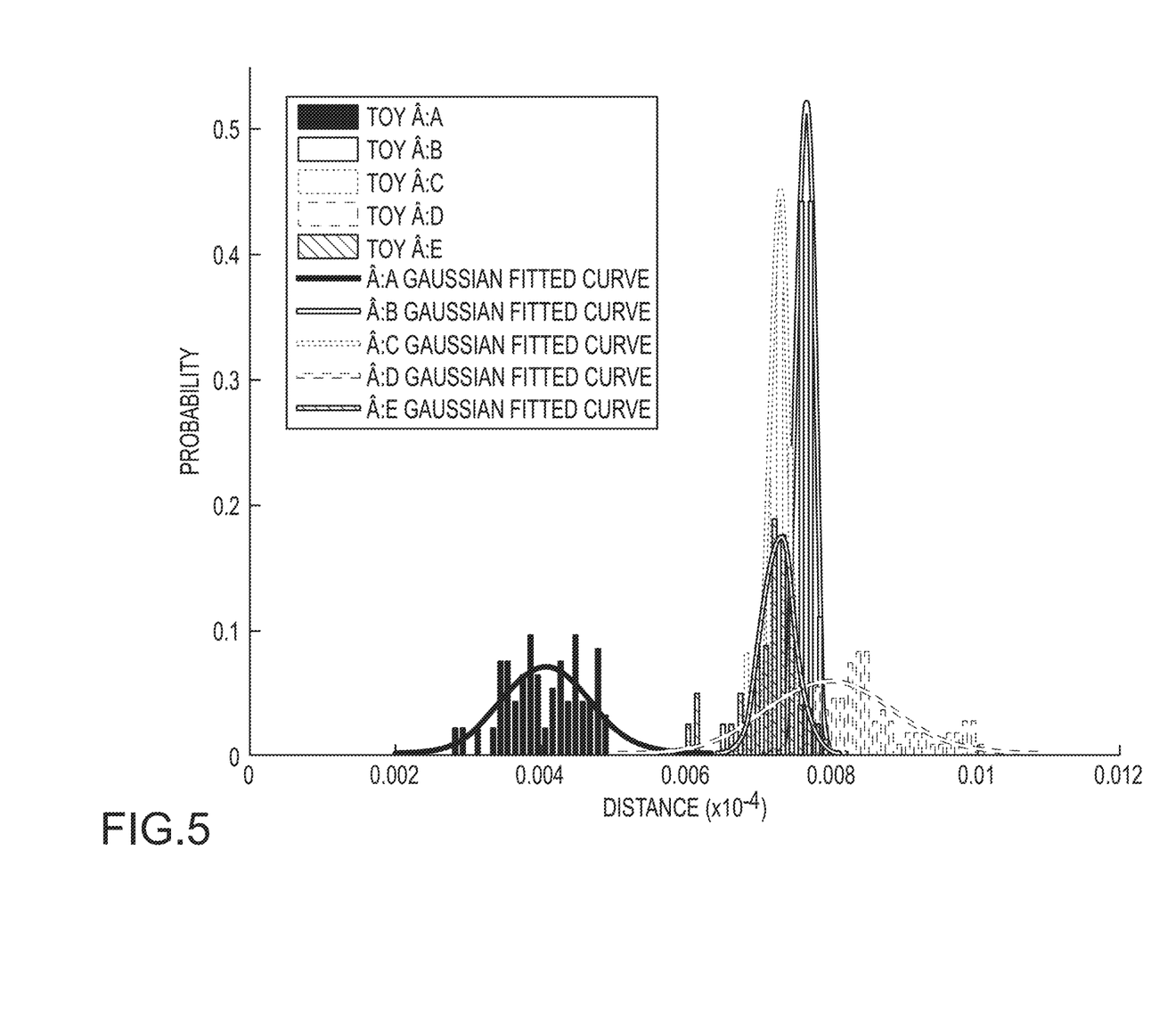
FIG. 5 shows a histogram of Euclidean distances between an unknown test toy $A_i$ and the five known toys A, B, C, D and E, whose EM-IDs are stored in a database. In this example, toy A is correctly classified as matching $A_i$ since it has the shortest distance and its probability distribution does not overlap with any other toys.

This section describes a method for quantifying the probability of successfully identifying a device based on the distribution of Euclidean distances. By modeling the histogram of distance data as a Gaussian distribution, as shown in FIGS. 5 and 6, the statistical information of all Euclidean distances can be used to predict the system's ability to correctly identify objects based on their EM signal from a database of EM-IDs. Consider $\mu_s$ and $\sigma_s$, which are the mean and standard deviation of all distances from the same electronic device $d(\mu_X, \mu_{X'_i})$, while $\mu_D$ and $\sigma_D$ are the mean and standard deviation for all distances from different devices but within the same category $d(\mu_{X'_i}, \mu_Y)$. The probability of success can be computed as:

$$P_s = \text{Prob.}[d(u_x, u_{x'_i}) < d(u_y, u_{x'_i})] \quad (3)$$

Equation 3 presents the probability of success by finding all distances from the same device that are smaller than those from different devices. Therefore, once $\mu_s$, $\sigma_s$, $\mu_D$, and $\sigma_D$ are obtained, the success rate Ps can be calculated through the Gaussian distribution model for each electronic device as:

$$P_S = \int_{-\infty}^{\infty}\int_x^{\infty} \frac{1}{\sigma_S\sigma_D 2\pi} e^{-\frac{(x-\mu_S)^2}{2\sigma_S^2}} e^{-\frac{(y-\mu_D)^2}{2\sigma_D^2}} dxdy \approx \quad (4)$$

$$\int_{\mu_S-3\sigma_S}^{\mu_S+3\sigma_S}\int_x^{\mu_D+3\sigma_D} \frac{1}{\sigma_S\sigma_D 2\pi} e^{-\frac{(x-\mu_S)^2}{2\sigma_S^2}-\frac{(y-\mu_D)^2}{2\sigma_D^2}} dxdy$$

Figure 7:
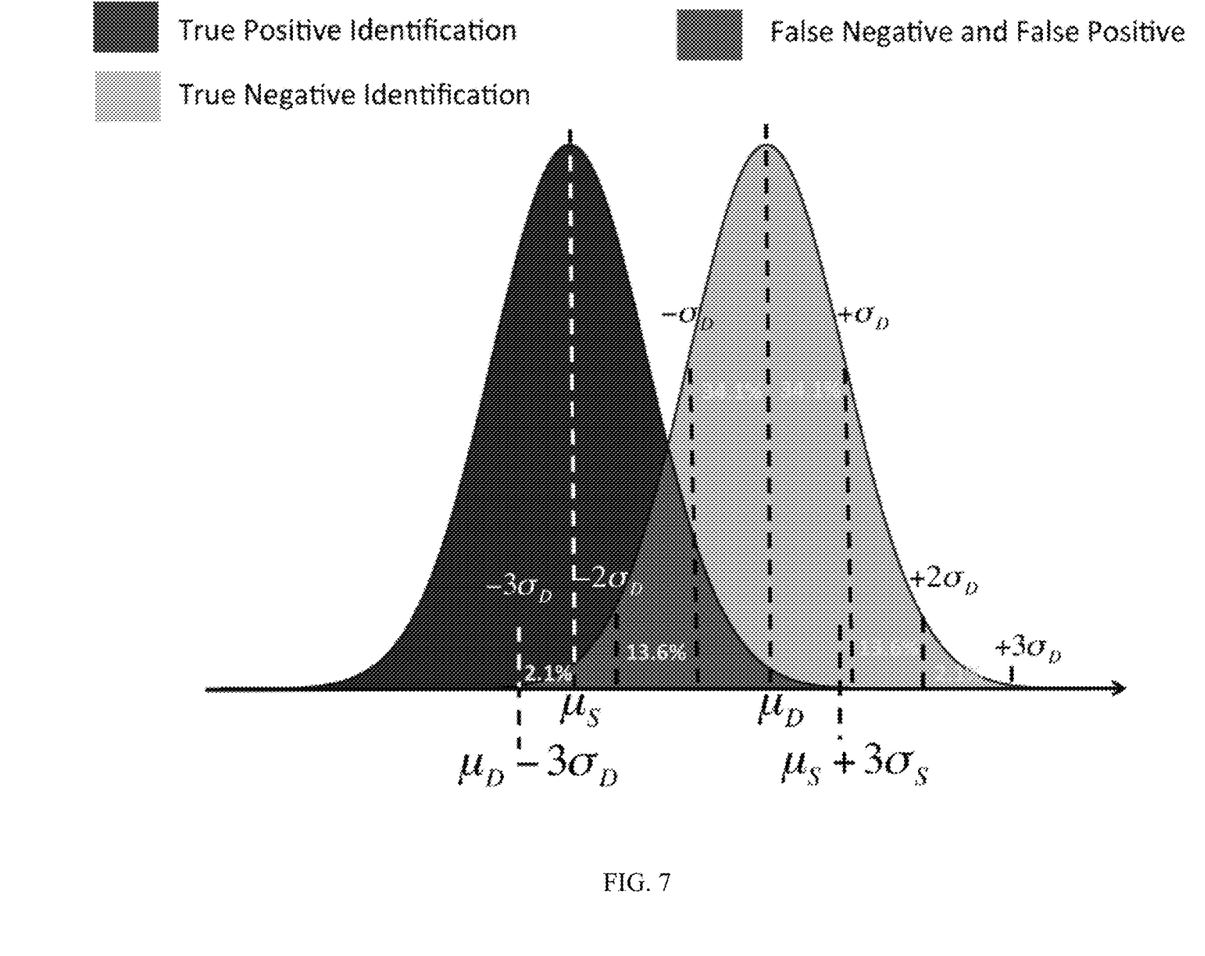
FIG. 7 illustrates that the successful rate of identification can be estimated through the integral of true positive and true negative.

FIG. 7 illustrates the probability of accurately classifying an unknown device when the database contains overlapping Gaussian probability distributions. The blue curve represents the $d(\mu_{X'_i}, \mu_X)$ distribution while the brown curve represents the $d(\mu_{X'_i}, \mu_Y)$. The area shaded in blue indicates a True Positive identification, where an unknown device is correctly classified as matching the test vector stored in the database. The area shaded in brown indicates a True Negative identification, where an unknown device is correctly classified as not matching the test vector stored in the database. The region of space that falls under both the blue and brown curves that is shaded in red is a concatenation of the False Negative and False Positive identification, and represents an error. Thus the more the two Gaussian distributions overlap, and the larger the red region, the higher the probability of mis-classifying the unknown device. Therefore to calculate the probability of successfully classifying an unknown device, one must calculate the area of the blue and brown shaded regions using Equation 4.

Since 99.73% of the Gaussian distribution area is within 3 standard deviations of distance, the integration area can be reduced to obtain the approximate probability of success. Thus, this leads to one important result: a 100% success rate, or an error-free identification, must have the following property:

$$(\mu_D - \mu_s) > (3 \times (\sigma_D + \sigma_s)) \quad (5)$$

To achieve error free identification as defined in Equation 5, the relative distance of the mean between the blue and brown curves must be more than 3 total sigma ($\sigma_D + \sigma_s$). This property can be used to predict why the toy is error free while the Macbook Pro trackpad's EM signals have some identification failures. As will be shown in the results section, the equality $(\mu_D - \mu_s) > (3 \times (\sigma_D + \sigma_s))$, is true for the toy category, but not the Macbook Pro category.

Experimental Results and Performance

In order to evaluate the effectiveness of the proposed EM based identification system, both category and individual device identification have been tested. Additionally the success rate prediction algorithm is also used to estimate performance which is then compared to measured results.

For testing, five different categories of electronic devices were chosen ranging from simple toys to laptop computers. For each device type, identical versions of the same model were used for testing the system's ability to disambiguate similar electronic devices. A total of 40 devices were tested including: 5× General Electric fluorescent tube lightbulb (Model: GE-F54W), 5× toy, 20× Dell LCD 24 inch screen (Model: U2413F), 5× Apple iPhone 6 (Model: A1549), and 5× Macbook Pro Retina Mid-2014. For both the iPhone 6 and Dell LCD screens, the same image was displayed on each of the five respective units during EM measurements. For the five Macbook Pros, the trackpad was scanned with the EM-ID reader, although other parts of the laptop such as the screen and keyboards could also be used as a secondary measurement for redundancy.

To generate the EM-ID database each of the 40 devices was scanned once and their respective EM-IDs were stored. To show that the EM emissions from these devices are stable and persistent overtime the EM-ID database was collected and the testing was conducted five months later. In order to show the reliability of the EM-ID system to both determine a device's category and its individual identity, each of the 40 devices was scanned 30 times and compared to EM-IDs in the database, resulting in 1,200 total trials.

Figure 8:
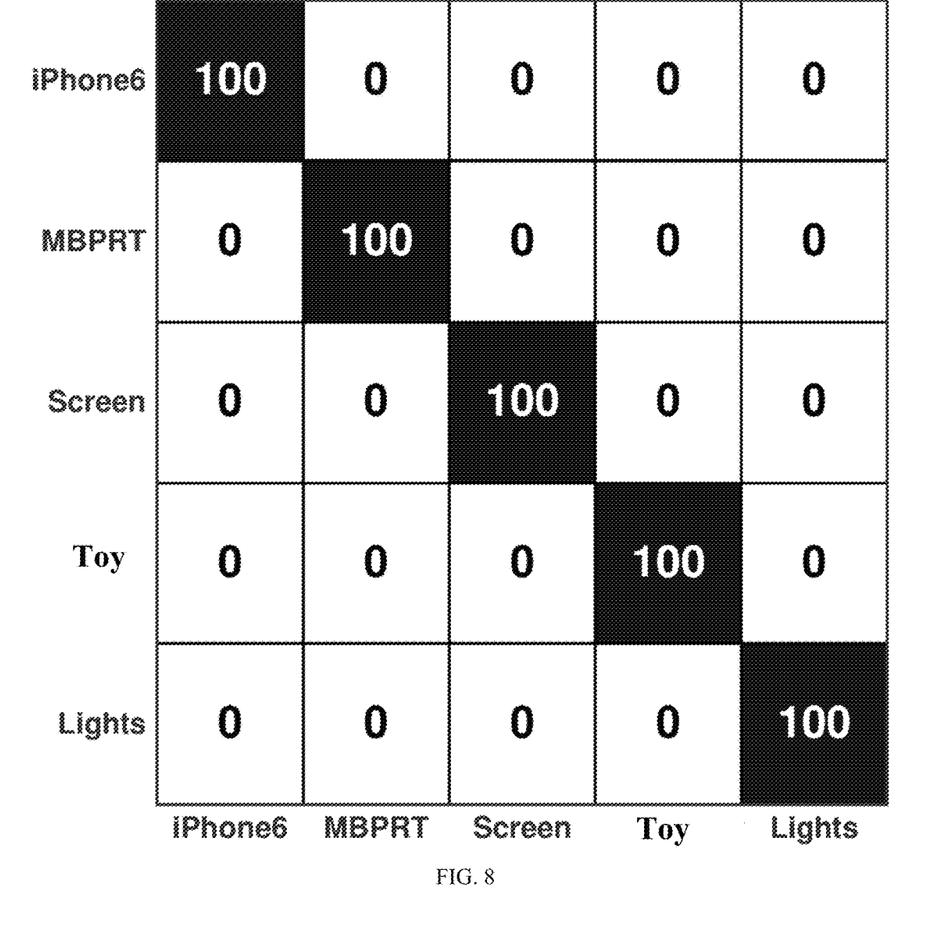
FIG. 8 is a confusion matrix for category classification, showing that the EM-ID algorithm can reliably determine device type based solely on its electromagnetic emissions.

The results from category testing are shown in FIG. 8. In order to reduce computational complexity, only one EM-ID from each of the five categories was used for comparison. For example, when testing an unknown device, only one device from each category was needed for comparison. Results show that the cosine similarity function produced robust category classification accuracy across the 1,200 trials with a total accuracy of 100%.

Once an unknown device's category has been determined the second, more challenging task is to determine which of the five devices of the same model it corresponds to. Again, the cosine similarity function is used to determine the degree to which the EM-ID candidate vectors are aligned and the one with the highest score is chosen as a match. Results are shown in the five confusion matrices in FIG. 9. Five identical models of the toy, MacBook Pro, florescent lightbulb, and iPhone 6 were each tested for 30 trials. For the toy, the identification algorithm perfectly identified the individual device 30 times (i.e., Toy A was correctly identified as Toy A). The five MacBook Pros had an average identification accuracy of 94.6% and the GE florescent lightbulb had an average accuracy of 86%. Fortunately, 20 units of the Dell LCD screen were available for testing, and each unit was scanned 30 times. The results show an average identification accuracy of 94.7%.

The results for the iPhone 6 are less reliable with an average accuracy of 71.2%. This is primarily due to iPhone "C" being completely mis-categorized as iPhone "B". As described in the text, since the electromagnetic emissions generated by a device are an emergent property, it is not possible to ensure that EM-IDs are always unique and never collide. Fortunately the algorithm for Predicting the Identification Success Rate (presented above) was able to accurately predict these failures. This is shown in the columns labeled Ps next to the confusion matrices shown in FIG. 9, which accurately predicts the success rate. Note that the column denoted Ps next to each matrix shows the predicted success rate of identifying each individual device. This is an important result since the success rate prediction Ps was made based only on the original EM-ID database created in October. Thus when a user enters a device into the database, the success rate prediction algorithm can be run and can alert the user if the new device is unique enough to be read or if an alternate strategy is needed.

Error free identification performance can be predicted by using the Euclidian distance information in Table I, which lists each category's average distance and standard deviation. For instance, for the toy $\mu_D - \mu_s = 2.69 \times 10^{-3}$ while $3 \times (\sigma_D + \sigma_s) = 1.098 \times 10^{-3}$. Thus, by using the criteria for error free identification performance defined in Equation (5), the toys satisfy the equality therein, such that it has error free identification performance.

This patent application proposes a method for individually identifying electronic devices, without the need to add bar codes or RFID tags, simply by measuring the electromagnetic noise they generate when powered on. These electromagnetic emissions are captured using a low cost (~$10) hand held reader and can reliably extract the EM-ID of the device under test.

This work presents a new computationally lightweight algorithm that can determine the similarity in the EM-IDs of devices and shows an increase in category classification accuracy over previous work. More importantly, for the first time, this work tackles the more challenging task of individually identifying an unknown device out of a population of the same model. Testing was done on electronic devices as simple as a toy and as complex as a smart phone with identification accuracy ranging from 100% to 71.2% respectively.

As has been demonstrated, individual instances within certain classes of electronic devices are more easily distinguished from each other, while for other classes of electronic devices, it is more challenging to distinguish individual instances within that class. While not all classes of electronic devices are guaranteed to be individually identifiable, the success rate prediction algorithm presented here can accurately predict the likelihood that a device can be identified out of a population of the same model. Ultimately, the signal processing and mathematical framework established here lays the foundation for utilizing electromagnetic emissions for identification purposes. It should be understood that the concepts discussed in this patent application will apply no matter the particular algorithm or class of algorithms used to compare and find the best match.

The RFID reader could be held in close enough proximity to receive the electromagnetic signals radiated by the nearby electronic device, or the reader could be brought into contact with the electronic device, or the reader could be held by or worn on the body of a user who has a body part in contact with or in close enough proximity to the nearby electronic device.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A method for identifying a particular instance of an electronic device, the method comprising:
   receiving a spectrum of electromagnetic signals emitted by an electronic device under examination;
   after the receiving, determining a category classification of the electronic device based on the received spectrum of electromagnetic signals;
   after the determining, comparing the received spectrum of electromagnetic signals to a library of spectrums of electromagnetic signals for electronic devices belonging to the category classification, each of the spectrums of electromagnetic signals in the library representing the spectrum of electromagnetic signals produced by a particular instance of an electronic device belonging to the category classification;
   finding a best match of the received spectrum of electromagnetic signals to one of the spectrums of electromagnetic signals in the library; and
   identifying the electronic device under examination as the electronic device in the library that produces the spectrum of electromagnetic signals to which the best match was made.

2. A method as defined in claim 1, wherein the comparing and finding operations include converting the spectrum of electromagnetic signals emitted by the electronic device under examination to a first vector and computing the Euclidean distance from the first vector to a plurality of vectors that each correspond to one of the spectrums of electromagnetic signals in the library.

3. A method as defined in claim 1, wherein the receiving operation includes providing an antenna and amplifying signals detected by the antenna.

4. A method as defined in claim 1, wherein the received spectrum includes the portion of the electromagnetic spectrum up to 1 MHz.

5. A method as defined in claim 1, wherein the received spectrum includes the portion of the electromagnetic spectrum up to 500 kHz.

6. A method as defined in claim 1, wherein the received spectrum includes the portion of the electromagnetic spectrum up to 200 kHz.

7. A method as defined in claim 1, wherein the received spectrum includes the portion of the electromagnetic spectrum up to 100 MHz.

8. A method as defined in claim 1, wherein the received spectrum includes the portion of the electromagnetic spectrum up to 20 kHz.

9. A method as defined in claim 1, wherein the received spectrum includes the portion of the electromagnetic spectrum up to 10 kHz.

10. A method as defined in claim 1, wherein the received spectrum includes the portion of the electromagnetic spectrum up to 5 kHz.

11. A method as defined in claim 1, wherein the received spectrum includes the portion of the electromagnetic spectrum up to 3 kHz.

12. The method of claim 1, wherein the spectrum of electromagnetic signals is converted into an electromagnetic identification (EM-ID) and wherein the finding the best match comprises using a cosine similarity function to rank similarity between the EM-ID and representations of the spectrums of the electromagnetic signals in the library.

13. The method of claim 12, wherein the EM-ID is a vector and wherein the representations in the library are vectors.

14. The method of claim 12, wherein the similarity rank is used to determine the best match as having a highest probability match.

15. The method of claim 1, wherein the determining of the category classification of the electronic device comprising using a cosine similarity function to rank a plurality of potential category classifications for the electronic device based on the received spectrum of electromagnetic signals.

16. The method of claim 15, wherein the received spectrum of electromagnetic signals is converted to a vector prior to the using of the cosine similarity function.

17. The method of claim 1, wherein the category classification defines a model of a device produced by a manufacturer or distributed by a distributor.

18. A method comprising:
separately for each of a group of electronic devices of the same type, receiving the spectrum of electromagnetic signals emitted by each electronic device in the group;
creating a library of the received spectrums, including an indication of which electromagnetic device in the group produced each spectrum;
after the creating of the library, receiving a spectrum of electromagnetic signals emitted by an electronic device that is powered on;
comparing the received spectrum of electromagnetic signals to the library of spectrums of electromagnetic signals using a cosine similarity function;
finding a best match of the received spectrum of electromagnetic signals to one of the spectrums of electromagnetic signals in the library based on rankings from the cosine similarity function; and
identifying the electronic device under examination as the electronic device in the library that produces the spectrum of electromagnetic signals to which the best match was made.

19. A method as defined in claim 18, wherein the comparing and finding operations include converting the spectrum of electromagnetic signals emitted by the electronic device under examination to a first vector and computing the Euclidean distance from the first vector to a plurality of vectors that each correspond to one of the spectrums of electromagnetic signals in the library.

20. A method as defined in claim 18, wherein the receiving operation includes providing an antenna and amplifying signals detected by the antenna.

21. A method as defined in claim 18, wherein the received spectrum includes the portion of the electromagnetic spectrum up to 1 MHz.

22. A method as defined in claim 18, wherein the received spectrum includes the portion of the electromagnetic spectrum up to 500 kHz.

23. A method as defined in claim 18, wherein the received spectrum includes the portion of the electromagnetic spectrum up to 200 kHz.

24. A method as defined in claim 18, wherein the received spectrum includes the portion of the electromagnetic spectrum up to 100 MHz.

25. A method as defined in claim 18, wherein the received spectrum includes the portion of the electromagnetic spectrum up to 20 kHz.

26. A method as defined in claim 18, wherein the received spectrum includes the portion of the electromagnetic spectrum up to 10 kHz.

27. The method of claim 18, further comprising, prior to the comparing step, classifying the electronic device emitting the received electromagnetic emissions into a category and wherein the spectrums in the library are each associated with an electronic device belonging to the category.

28. The method of claim 27, wherein, prior to the comparing, the received spectrum is converted into a vector and wherein the received spectrums in the library are represented as vectors.

29. The method of claim 27, wherein the similarity rank is used to determine the best match as having a highest probability match.

30. A method for identifying a particular instance of an electronic device, the method comprising:
receiving an electromagnetic signal emitted by an electronic device whenever the electronic device is powered on;
after the receiving, determining a category classification of the electronic device based on the received electromagnetic signal by using a cosine similarity function to score comparisons of the received electromagnetic signals and representations of electromagnetic signals stored in two or more databases;
after the determining, finding a highest probability match by comparing the received electromagnetic signal to one of the databases matching the category classification, wherein the finding the highest probability match comprises using a cosine similarity function to rank similarity between the received electromagnetic signal and the representations of the electromagnetic signals in the one of the databases; and
identifying the electronic device as the particular instance using the highest probability match.

31. The method of claim 30, further comprising, before the finding, converting the received electromagnetic signal to a vector and wherein the representations in the databases are vectors.

32. The method of claim 30, wherein the category classification defines a model of a device produced by a manufacturer or distributed by a distributor and wherein the representations of electromagnetic signals correspond to emissions from a plurality of devices of the model.

* * * * *